US012158028B2

(12) United States Patent
Wu

(10) Patent No.: US 12,158,028 B2
(45) Date of Patent: Dec. 3, 2024

(54) LOCKSET

(71) Applicant: SINOX CO., LTD, New Taipei (TW)

(72) Inventor: Chia-Ming Wu, New Taipei (TW)

(73) Assignee: SINOX CO., LTD, New Taipei (TW)

( * ) Notice: Subject to any disclaimer, the term of this patent is extended or adjusted under 35 U.S.C. 154(b) by 435 days.

(21) Appl. No.: 17/508,536

(22) Filed: Oct. 22, 2021

(65) Prior Publication Data

US 2022/0235585 A1 Jul. 28, 2022

(30) Foreign Application Priority Data

Jan. 22, 2021 (TW) ................................ 110200868
May 27, 2021 (TW) ................................ 110206127

(51) Int. Cl.
*E05B 73/00* (2006.01)
*E05B 37/02* (2006.01)

(52) U.S. Cl.
CPC .......... *E05B 73/0082* (2013.01); *E05B 37/02* (2013.01); *E05B 73/0005* (2013.01)

(58) Field of Classification Search
CPC .. E05B 73/0082; E05B 37/02; E05B 73/0005; E05B 15/00; E05B 17/16;
(Continued)

(56) References Cited

U.S. PATENT DOCUMENTS 505,299 A * 9/1893 Schneider ............... E05B 17/16 70/428
4,445,348 A * 5/1984 Saitoh ..................... E05B 37/02 70/319
(Continued)

FOREIGN PATENT DOCUMENTS

CN 101131059 A 2/2008
CN 202273483 U * 6/2012 ......... E05B 73/0082
(Continued)

OTHER PUBLICATIONS

Great Britain Search Report Under Section 17(5) for Application No. GB2200509.4 dated Jun. 28, 2022.
(Continued)

*Primary Examiner* — Christine M Mills
*Assistant Examiner* — Faria F Ahmad
(74) *Attorney, Agent, or Firm* — Birch, Stewart, Kolasch & Birch, LLP

(57) ABSTRACT

A lockset includes a housing, a rotary hook, a driving device, and a lock body. The rotary hook is disposed in the housing and includes front end portions and rear end portions. At least part of the front end portions extends out of the housing. The driving device includes a force application member, a first driving member, and a second driving member. The force application member includes a force bearing portion and a force application portion respectively disposed outside and inside the housing. The force bearing portion is connected to and is rotatable with the force application portion. The first driving member is rotatable with the force application portion. The second driving member is rotatable with the first driving member to change an opening width of the front end portions. The lock body restricts a movement of the driving device when closed.

9 Claims, 9 Drawing Sheets

(58) Field of Classification Search
CPC . Y10T 70/5009; Y10T 70/7983; Y10T 70/40; Y10T 70/7966; Y10T 70/7972; Y10T 70/7305
See application file for complete search history.

(56) References Cited

U.S. PATENT DOCUMENTS

| | | | | |
|---|---|---|---|---|
| 4,732,021 A * | 3/1988 | Su | E05B 37/02 70/312 |
| 5,661,991 A * | 9/1997 | Hsu | E05B 37/02 70/312 |
| 6,401,502 B1 * | 6/2002 | Yang | E05B 73/0082 70/30 |
| 6,523,373 B1 * | 2/2003 | Su | E05B 73/0005 70/426 |
| 7,185,518 B1 * | 3/2007 | Huang | E05B 73/0082 70/58 |
| 7,234,326 B1 * | 6/2007 | Lu | E05B 73/0082 70/57 |
| 7,370,499 B1 * | 5/2008 | Lee | E05B 73/0005 70/284 |
| 9,187,934 B1 * | 11/2015 | Lee | E05B 73/0017 |
| 10,260,832 B2 * | 4/2019 | Bowe, Jr. | E05B 19/00 |
| 11,859,414 B2 * | 1/2024 | Kao | G06F 1/16 |
| 2006/0091679 A1 | 5/2006 | Tsai | |
| 2008/0034816 A1 * | 2/2008 | Lu | E05B 73/0082 70/58 |
| 2012/0312056 A1 * | 12/2012 | Yu | E05B 73/0082 70/14 |
| 2014/0026625 A1 * | 1/2014 | Wu | E05B 73/0082 70/14 |
| 2017/0247916 A1 * | 8/2017 | Kao | E05B 73/0082 |
| 2018/0058105 A1 | 3/2018 | Van Klompenburg et al. | |
| 2019/0226243 A1 * | 7/2019 | Lee | E05B 73/0082 |
| 2020/0115925 A1 * | 4/2020 | Ramakrishna | E05B 67/003 |
| 2020/0224451 A1 * | 7/2020 | Su | E05B 73/0082 |
| 2020/0248477 A1 | 8/2020 | Wu et al. | |
| 2021/0254369 A1 * | 8/2021 | Su | E05B 73/0082 |
| 2021/0388644 A1 * | 12/2021 | Wong | E05B 37/0058 |
| 2023/0079422 A1 * | 3/2023 | Su | E05B 73/0005 70/21 |
| 2023/0135591 A1 * | 5/2023 | Yang | E05B 73/0082 70/51 |
| 2023/0139662 A1 * | 5/2023 | Yang | E05B 73/0005 70/58 |
| 2023/0160236 A1 * | 5/2023 | Klinkman | E05B 73/0082 70/58 |

FOREIGN PATENT DOCUMENTS

| | | | | |
|---|---|---|---|---|
| CN | 202324922 U | | 7/2012 | |
| CN | 206158373 U | | 5/2017 | |
| CN | 209620909 U | | 11/2019 | |
| CN | 212249588 U | | 12/2020 | |
| DE | 202020100646 U1 | * | 5/2020 | E05B 73/0082 |
| JP | 2010-159575 A | | 7/2010 | |

OTHER PUBLICATIONS

Great Britain Search Report Under Section 17(5) for Application No. GB2200510.2 dated Jun. 28, 2022.

* cited by examiner

LOCKSET

TECHNICAL FIELD

The present invention relates to a lockset. Further, the present invention relates to a lockset for an electronic device.

BACKGROUND

In modem life, consumer electronic products play an important role. In view of the fast lifestyle and the demand of people for instant information, portable electronic products become one of necessities of people. However, the products are easily stolen or robbed due to relatively high unit prices and ease of cash realization.

For prevention of thievery, a lockset is designed, such as a notebook computer lock. A lock fastener of the notebook computer lock may be connected to a lock hole of an electronic product, and a movement of the lock fastener is controlled by using a key lock mechanism to complete locking/unlocking. However, due to lock holes of different specifications, a user needs to purchase/carry a lockset having a corresponding lock fastener according to the specification of a lock hole, which is not only uneconomical but also inconvenient to use.

SUMMARY

The present invention is intended to provide a lockset. The lockset is applicable to lock holes of different sizes and is convenient to use.

The lockset of the present invention includes a housing, a rotary hook, a driving device, and a lock body. The housing has a front opening at an end. The rotary hook is disposed in the housing, is rotatable relative to the housing, and includes front end portions and rear end portions. At least part of the front end portions extends out of the front opening. The rear end portions extend in a direction opposite to the direction in which the front end portions extend. The driving device includes a force application member, a first driving member, and a second driving member. The force application member includes a force bearing portion disposed outside the housing and a force application portion disposed inside the housing. The force bearing portion is connected to the force application portion by penetrating the housing, and is rotatable with the force application portion relative to the housing. The first driving member is disposed in the housing, and is rotatable with the force application portion. The second driving member is disposed in the housing, and is rotatable with the first driving member to selectively move, so as to change an opening width of the front end portions. The lock body is disposed in the housing. The lock body restricts a movement of the driving device when closed.

In an embodiment of the present invention, the force application portion is a disc having a plurality of protruding members disposed at a peripheral edge. The first driving member is a gear. The protruding members are snapped in tooth grooves of the gear, so that the first driving member is rotatable with the force application portion.

In an embodiment of the present invention, the rotary hook includes at least two rotary hooks. At least one of the rotary hooks is rotatable relative to the housing along a plane parallel to an X-Y plane. The second driving member is selectively movable to extend in a Y-axis direction by different depths between the rear end portions, so as to change the opening width of the front end portions. An X axis, a Y axis, and a Z axis are orthogonal.

In an embodiment of the present invention, the force application portion is rotatable along the plane parallel to the X-Y plane, and the first driving member is rotatable along a plane parallel to the X-Z plane.

In an embodiment of the present invention, the first driving member has a driving hole. An end of the second driving member is movable in the Y-axis direction to be snapped in the driving hole, so that the second driving member is rotatable with the first driving member.

In an embodiment of the present invention, the housing has therein an accommodating space extending along the Y axis, and a sidewall thread is disposed on a sidewall of the accommodating space. The second driving member is disposed in the accommodating space. The second driving member is a circular cylinder having a driving member thread on a side surface that is mated with the sidewall thread. When the first driving member is rotated, the second driving member is rotated with the first driving member. Under the action between the sidewall thread and the driving member thread, an end of the second driving member that faces the rear end portions is moved in the Y-axis direction to extend by different depths between the rear end portions.

In an embodiment of the present invention, an end of the second driving member that faces the rear end portions has an inclined plane.

In an embodiment of the present invention, the lockset includes a lock rod. When the lock body is closed, an end of the lock rod extends into the tooth grooves of the first driving member to restrict the rotation of the first driving member.

In an embodiment of the present invention, the lock rod is movable in the Y-axis direction.

In an embodiment of the present invention, the lockset further includes an elastic member. The elastic member is configured to provide an elastic force so that the rear end portions approach each other.

DETAILED DESCRIPTION

Figure 1A:
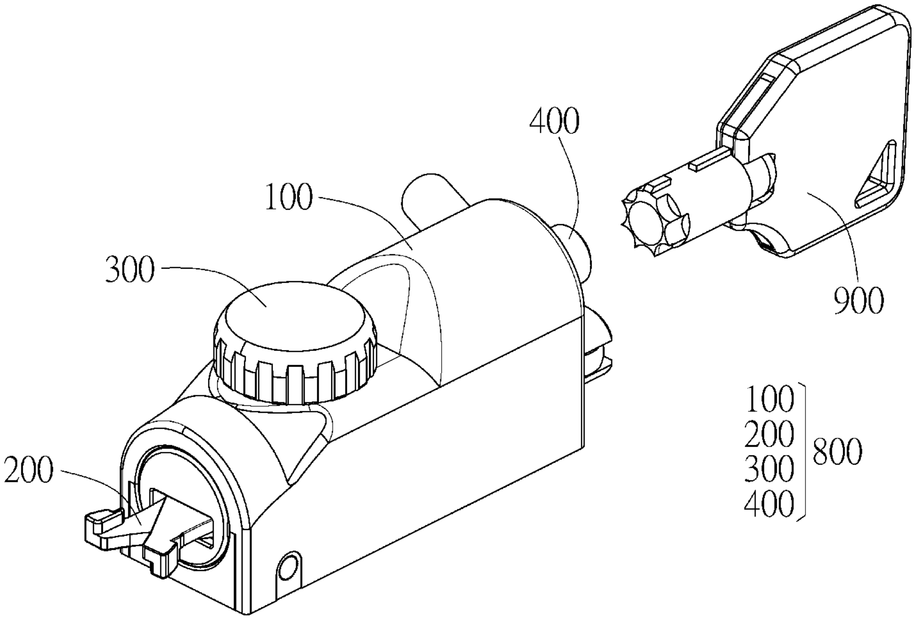
FIG. 1A and FIG. 1B are schematic diagrams of an embodiment of a lockset according to the present invention.
Figure 1B:
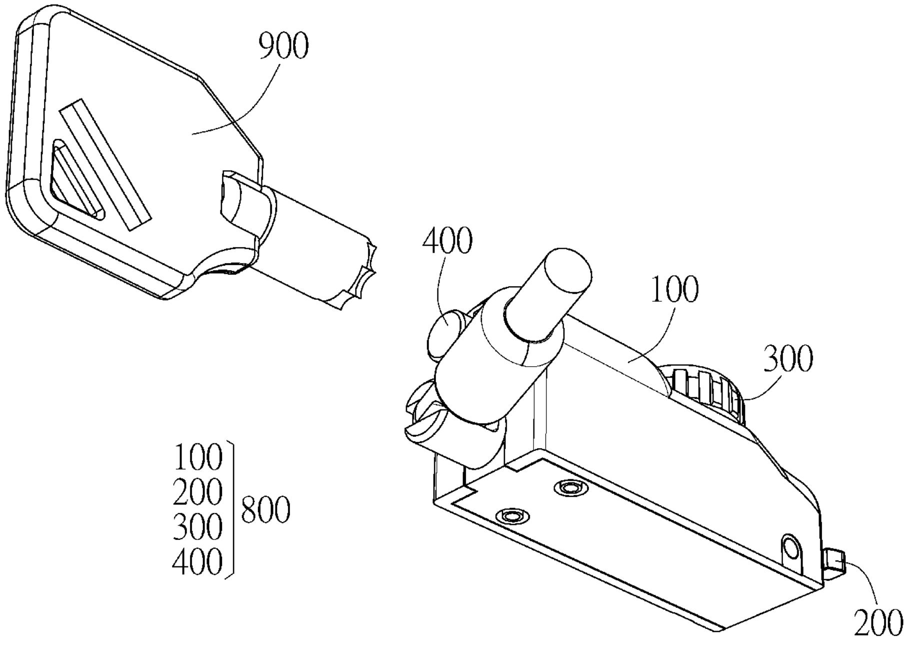

A lockset of the present invention is applicable to an electronic device, and is connected to a lock hole on the electronic device. The electronic device is preferably a portable electronic device, such as, but is not limited to, a notebook computer, a tablet computer, a mobile phone, an e-book, a digital frame, a global positioning system (GPS) navigator, a mobile network device, a personal digital assistant, a digital walkman, or an electronic dictionary.

In embodiments shown in FIG. 1A to FIG. 2B, a lockset 800 of the present invention includes a housing 100, a rotary hook 200, a driving device 300, and a lock body 400. The housing 100 has a front opening 110 at an end. The rotary hook 200 is disposed in the housing 100, and is rotatable relative to the housing 100. In this embodiment, the rotary hook 200 is disposed in the housing 100, and is rotatable relative to the housing 100 along a plane parallel to an X-Y plane. The rotary hook is scissor-shaped. However, in a different embodiment, the rotary hook 200 may include more than two hooks. At least one of the rotary hooks is rotatable relative to the housing 100 along the plane parallel to the X-Y plane, and is not limited to the scissor shape. The rotary hook 200 includes front end portions 210 and rear end portions 220. At least part of the front end portions 210 extends out of the front opening 110. A hook portion 211 laterally extending is disposed at an end of each front end portion 210. The rear end portions 220 extend in a direction opposite to the direction in which the front end portions 210 extend. An X axis, a Y axis, and a Z axis are orthogonal.

Figure 2A:
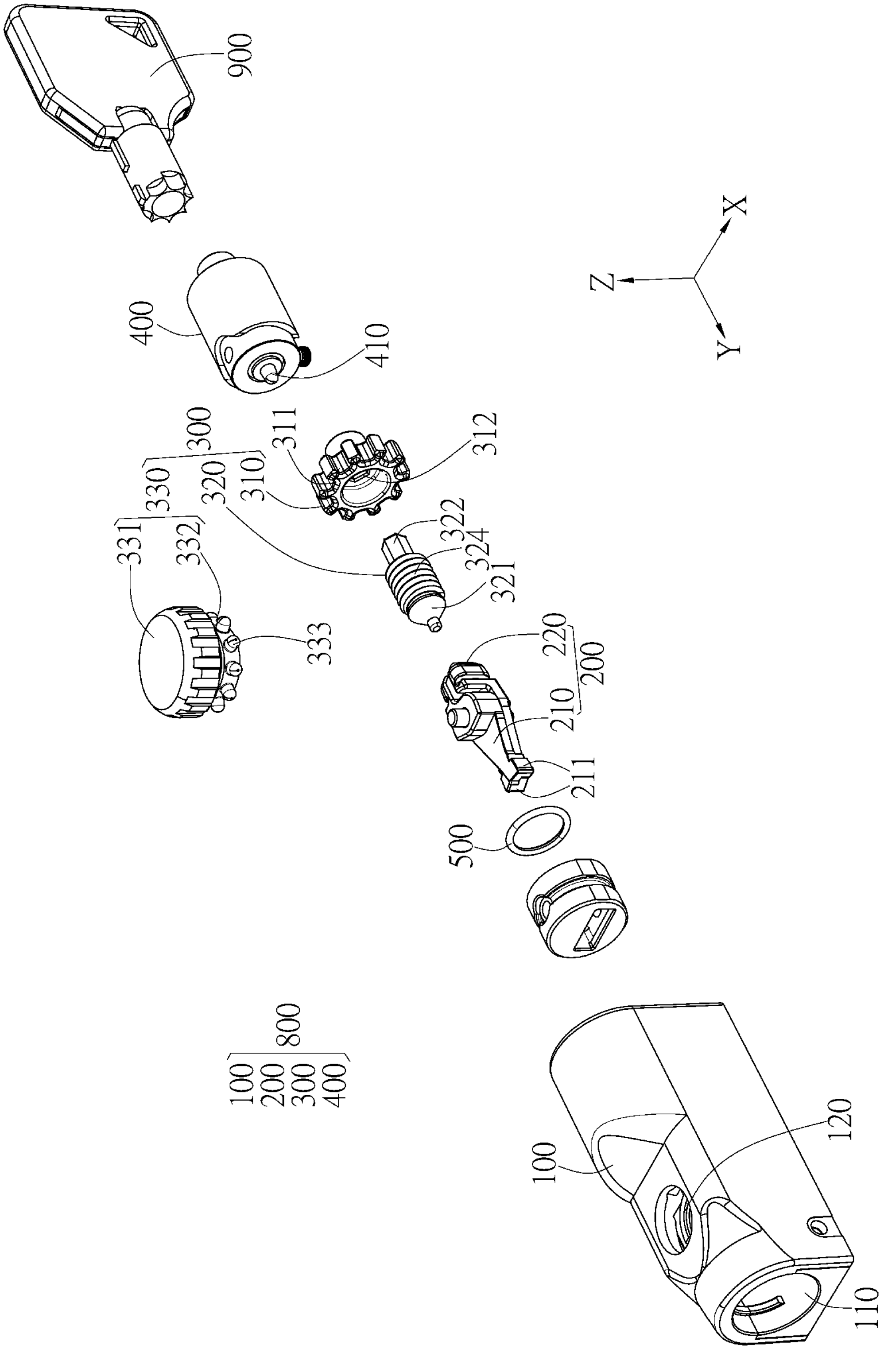
FIG. 2A and FIG. 2B are schematic exploded views of the embodiment of the lockset according to the present invention.
Figure 2B:
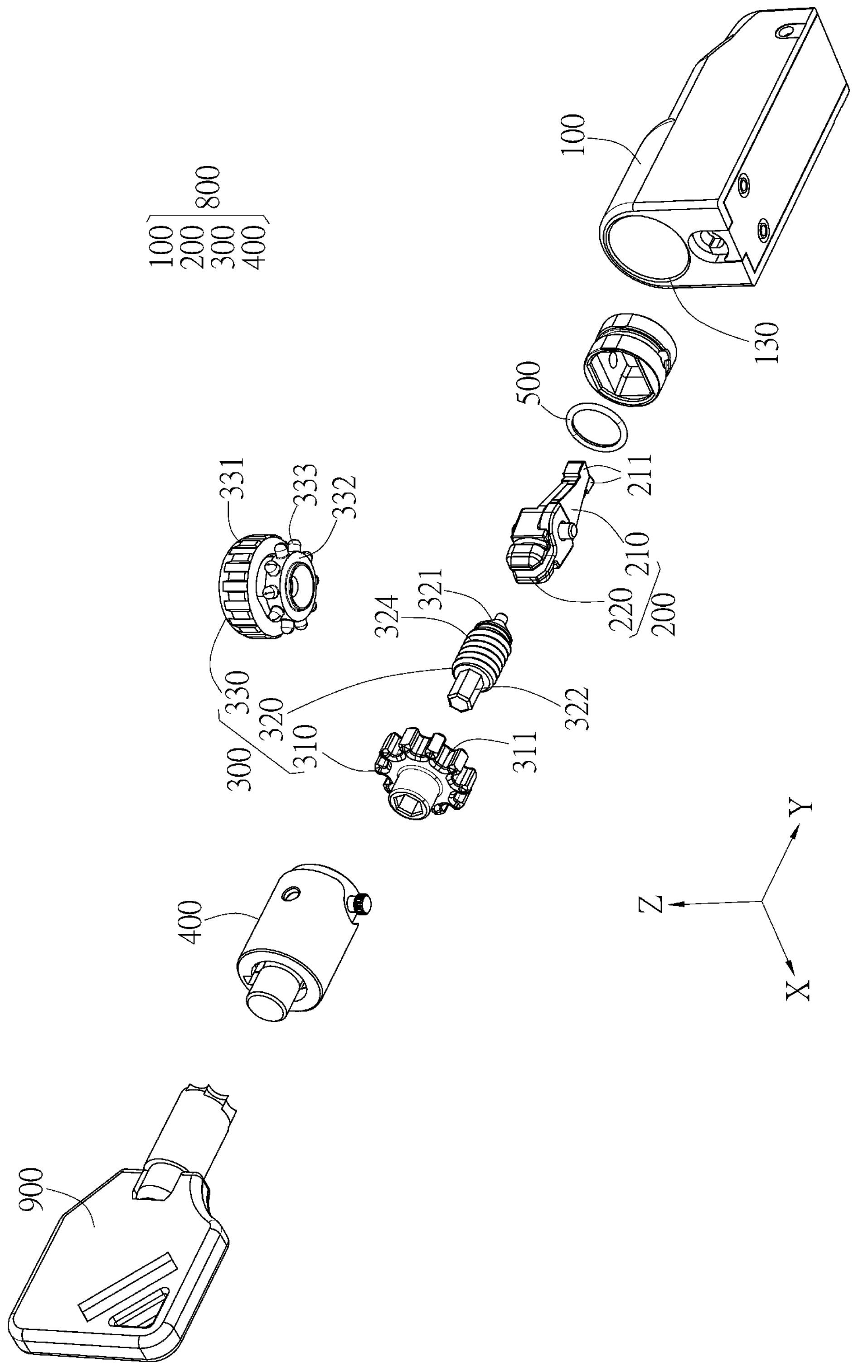

In the embodiment shown in FIG. 2A and FIG. 2B, the driving device 300 includes a force application member 330, a first driving member 310, and a second driving member 320. The force application member 330 includes a force bearing portion 331 disposed outside the housing 100 and a force application portion 332 disposed inside the housing 100. The force bearing portion 331 is connected to the force application portion 332 by penetrating the housing 100, and is rotatable with the force application portion relative to the housing 100. More specifically, in the embodiment shown in FIG. 2A, the housing 100 has a driving device opening 120. The force bearing portion 331 and the force application portion 332 are connected by penetrating the housing 100 through the driving device opening 120.

Figure 3A:
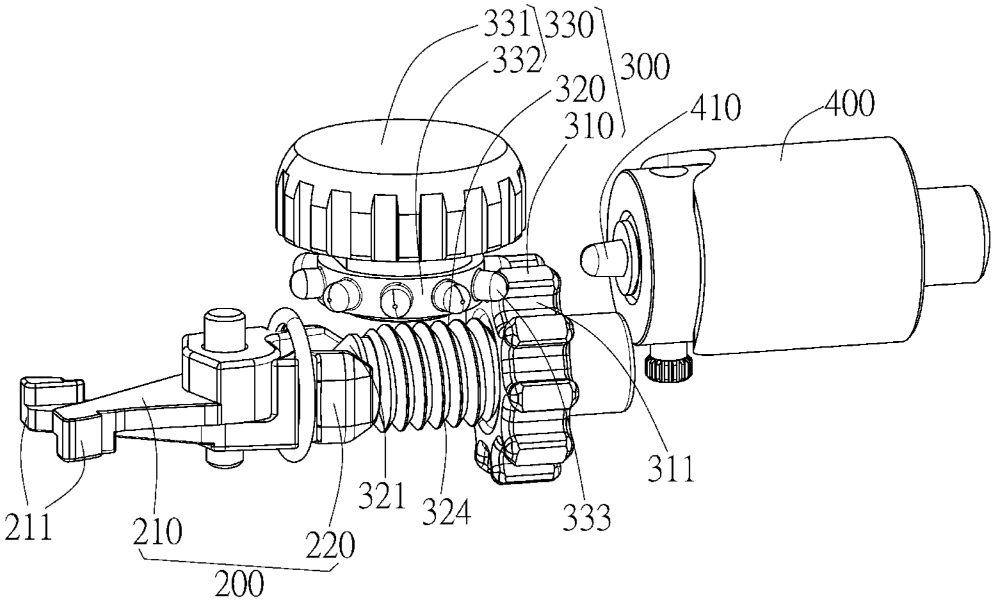
FIG. 3A and FIG. 3B are schematic diagrams of an embodiment in which a protruding member is snapped in a tooth groove in the lockset according to the present invention.
Figure 3B:
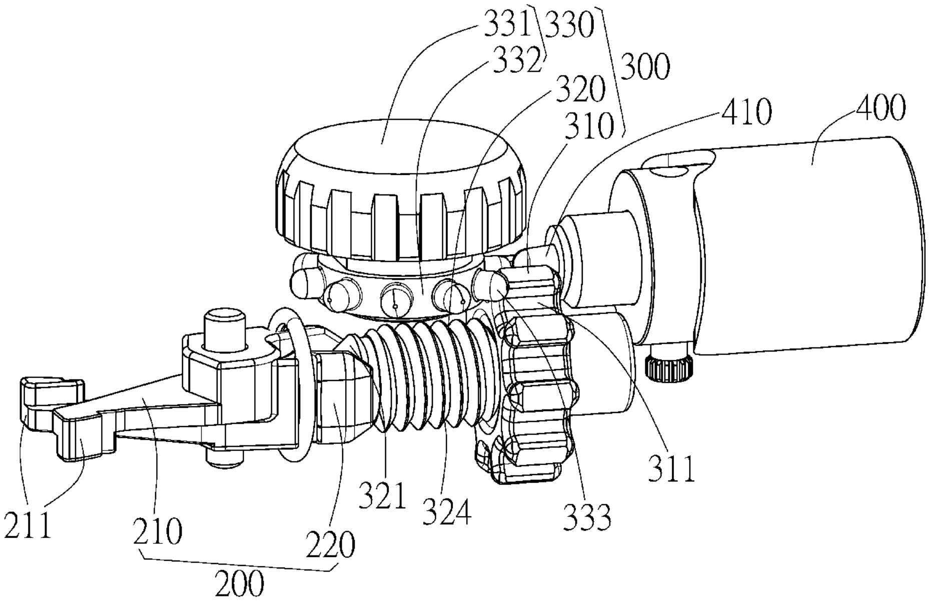
Figure 6:
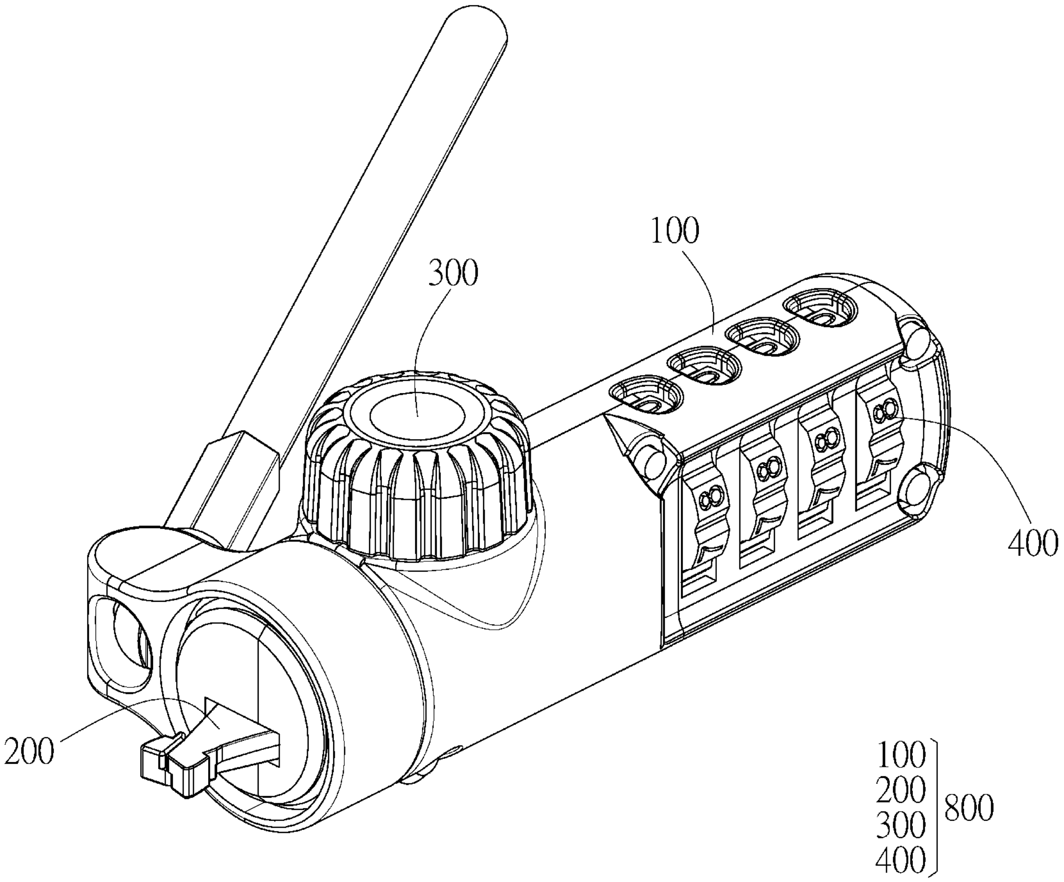
FIG. 6 is schematic diagram of an embodiment of a lockset having a combination lack as the lock body according to the present invention.

In the embodiment shown in FIG. 1A to FIG. 2B, the first driving member 310 is disposed in the housing 100, and is rotatable with the force application portion 332. The lock body 400 is disposed in the housing 100. The lock body 400 restricts a movement of the driving device 300 when closed. More specifically, in an embodiment shown in FIG. 3A and FIG. 3B, the force application portion 332 is a disc having a plurality of protruding members 333 disposed at a peripheral edge. The first driving member 310 is a gear. The protruding members 333 may be snapped in tooth grooves 311 of the gear. By means of the abutment between the protruding members 333 and the gear, when the force application portion 332 is rotated along the plane parallel to the X-Y plane, the first driving member 310 can be driven to rotate along a plane parallel to an X-Z plane. The lock body 400 includes a lock rod 410. When the lock body 400 is closed, an end of the lock rod 410 extends in the Y-axis direction into the tooth grooves 311 of the first driving member 310 to restrict the rotation of the first driving member 310, thereby restricting a movement of the driving device 300. In this embodiment, the lock body 400 is a key lock used with a key 900. However, in a different embodiment shown in FIG. 6, the lock body 400 may be a different lock, such as a combination lock.

In the embodiment shown in FIG. 2A and FIG. 2B, the second driving member 320 is disposed in the housing 100, and is rotatable with the first driving member 310 to selectively move, so as to change an opening width of the front end portions 210. In this embodiment, the first driving member 310 has a driving hole 312. An end 322 of the second driving member 320 is movable in the Y-axis direction to be snapped in the driving hole 312, so that the second driving member 320 is rotatable with the first driving member 310. More specifically, the driving hole 312 is polygonal. The end 322 of the second driving member 320 is a polygonal cylinder having an outer contour matching the driving hole. Thus, when the end 322 of the second driving member 320 is inserted into the driving hole 312, snapping is achieved on the X-Z plane, so that the second driving member 320 is rotatable with the first driving member 310. However, snapping is not achieved in the Y-axis direction, and therefore relative movement is allowed.

Figure 4A:
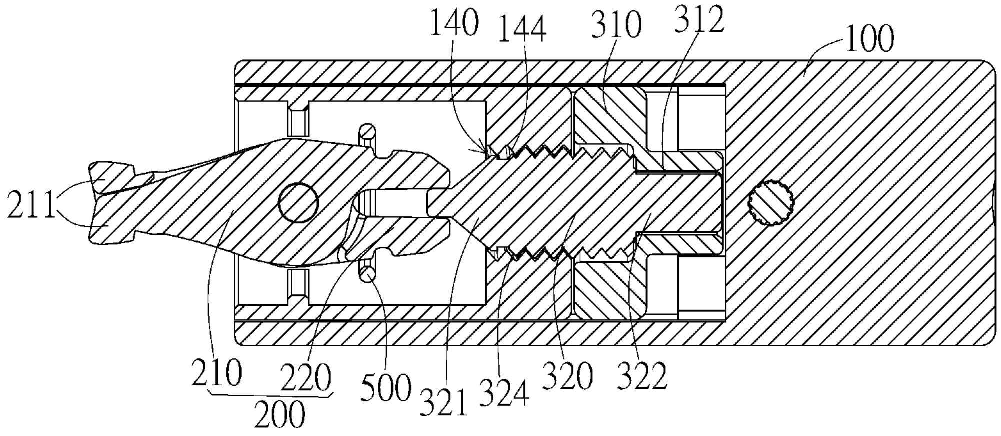
FIG. 4A to FIG. 4C are schematic diagrams of an embodiment in which a second driving member in the lockset extends by different depths between rear end portions according to the present invention.
Figure 4B:
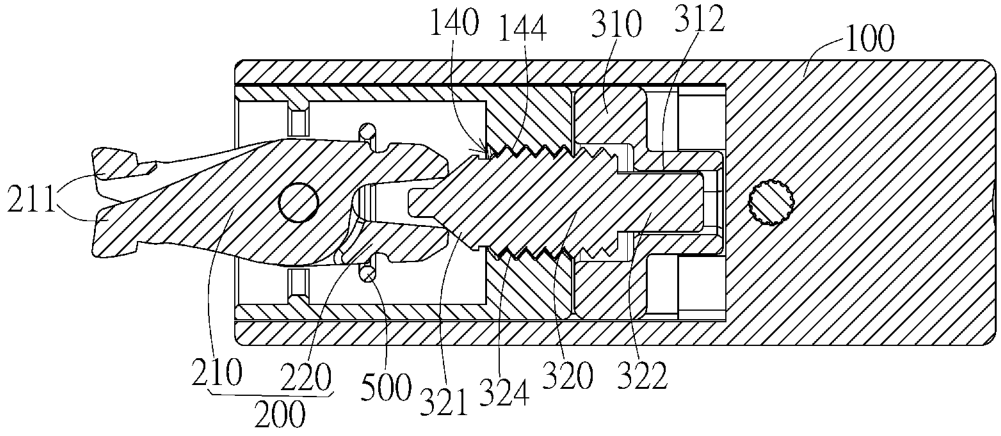
Figure 4C:
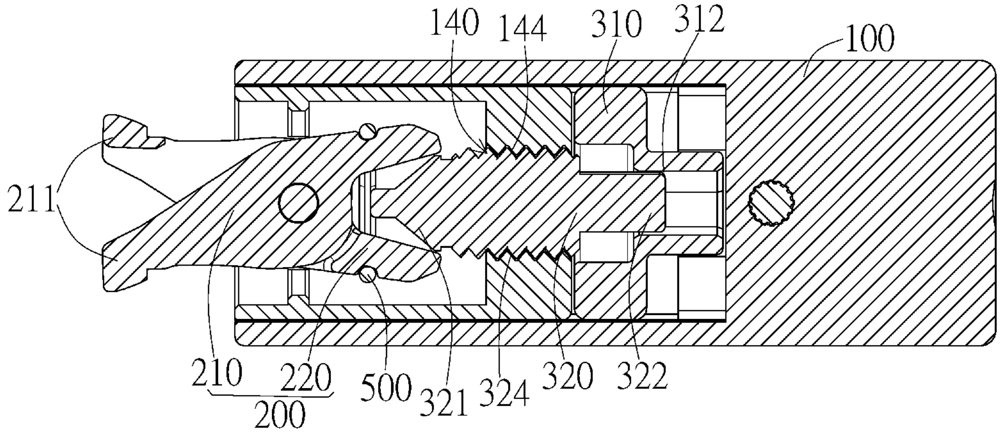

Further, in an embodiment shown in FIG. 4A to FIG. 4C, the housing 100 has therein an accommodating space 140 extending along the Y axis. A sidewall thread 144 is disposed on a sidewall of the accommodating space 140. The second driving member 320 is disposed in the accommodating space 140. The second driving member 320 is a circular cylinder having a driving member thread 324 on a side surface that is mated with the sidewall thread 144. By means of the abutment between the sidewall thread 144 and the driving member thread 324, when the first driving member 310 is rotated, the second driving member 320 is rotated with the first driving member. In this way, an end 321 of the second driving member 320 that faces the rear end portions 220 is moved in the Y-axis direction to extend by different depths between the rear end portions 220. The end 321 of the second driving member 320 that faces the rear end portions 220 has an inclined plane, helping the end 321 move in the Y-axis direction to extend by different depths between the rear end portions 220 and spread the rear end portions 220. The lockset 800 further includes an elastic member 500, such as a rubber ring. The elastic member is configured to provide an elastic force so that the rear end portions 220 approach each other.

Figure 5A:
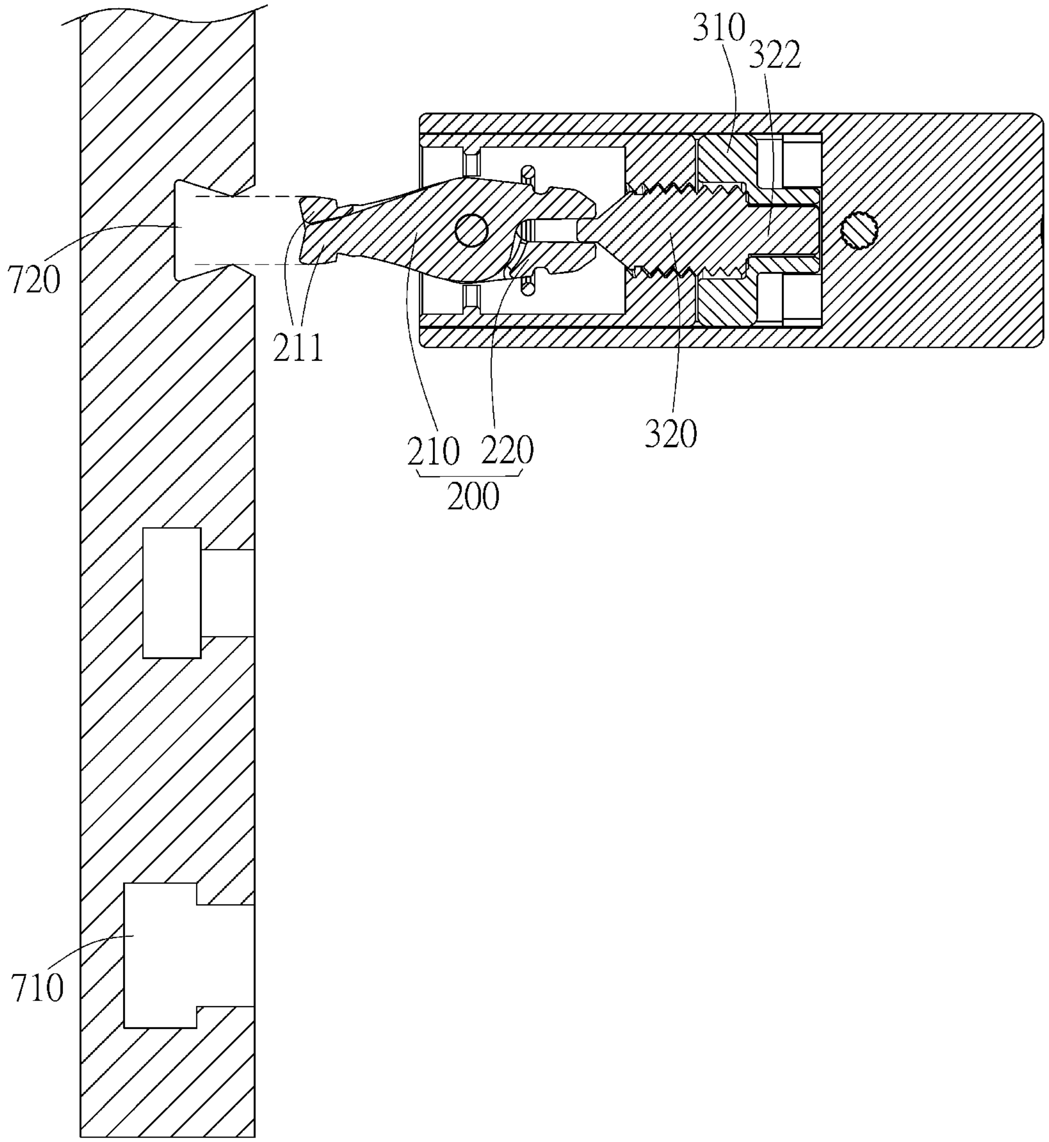
FIG. 5A to FIG. 5C are schematic diagrams of an embodiment in which a lockset is closed in a lock hole according to the present invention.
Figure 5B:
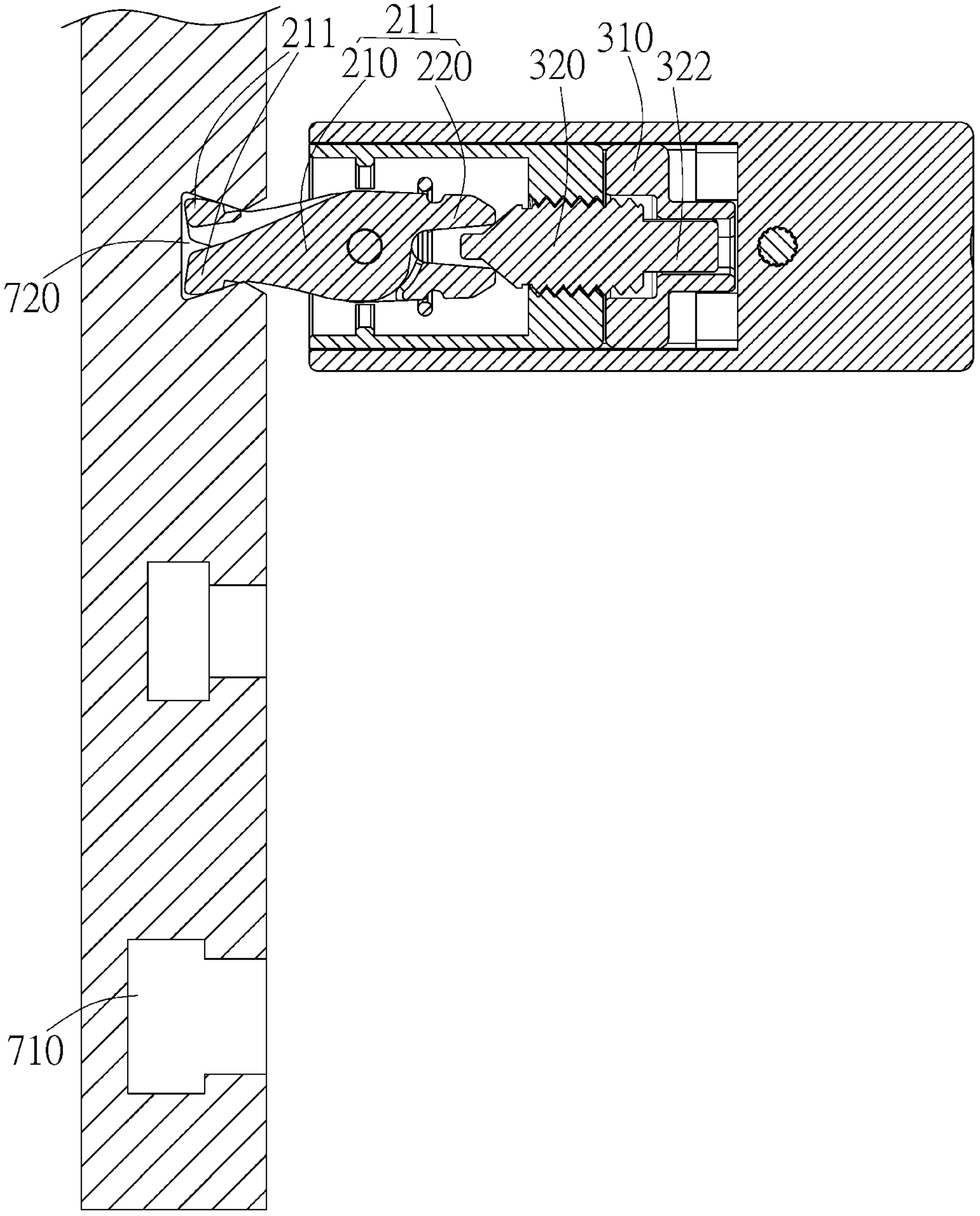
Figure 5C:
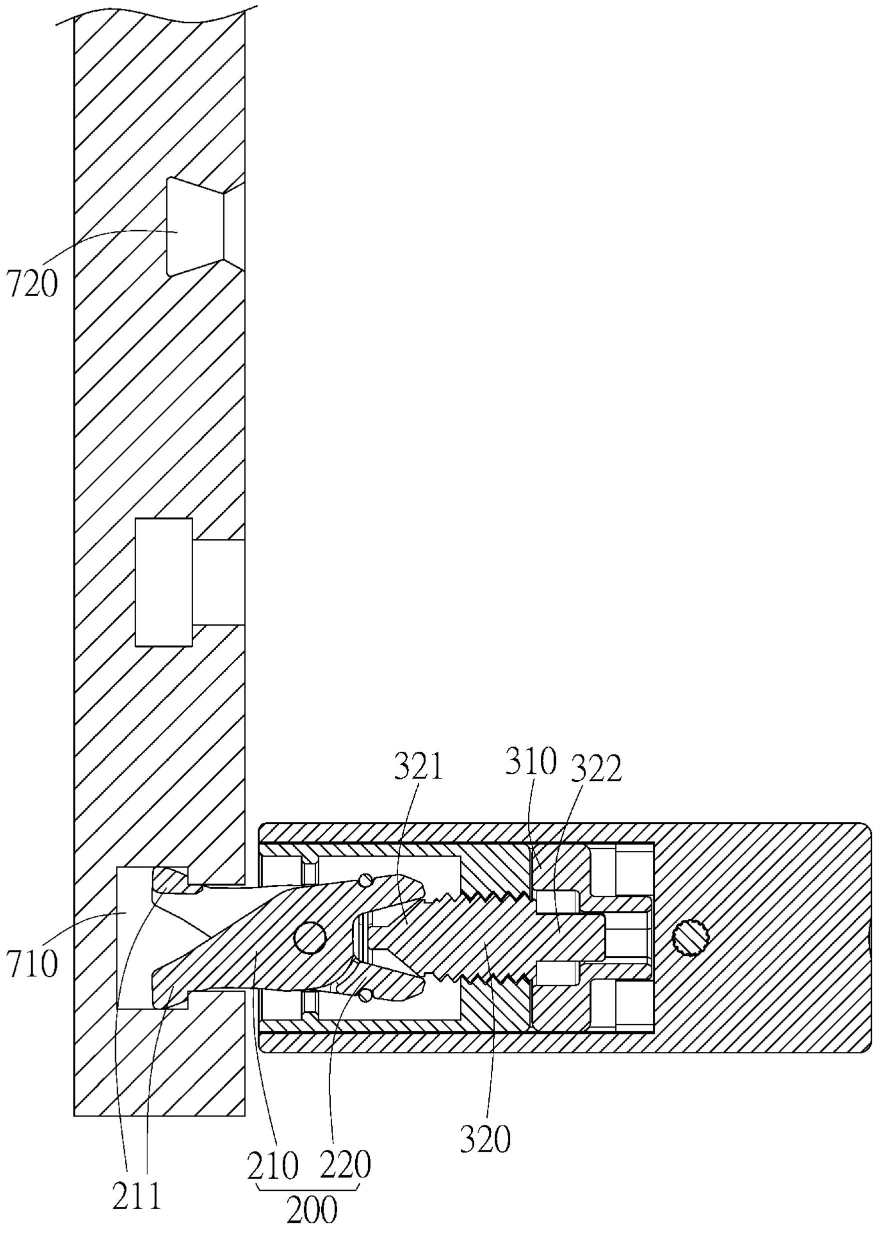

In an embodiment shown in FIG. 5A, a user may rotate the force bearing portion 331 in a direction (referring to FIG. 2A), so that the end 321 of the second driving member 320 that faces the rear end portions 220 is moved in the Y-axis direction to escape from the position between the rear end portions 220. In this case, by means of the elastic force of the elastic member 500, the rear end portions 220 can approach each other, so that the opening width of the front end portions 210 is reduced, thereby inserting the front end portions into a lock hole 720. In an embodiment shown in FIG. 5B, after the front end portions 210 are inserted into the lock hole 720, the user may reversely rotate the force bearing portion 331, so that the end 321 of the second driving member 320 that faces the rear end portions 220 is moved in the Y-axis direction to partially extend between the rear end portions 220. Therefore, the rear end portions 220 can be moved away from each other, to increase the opening width of the front end portions 210, thereby snapping the front end portions in the lock hole 720. In this way, the user may further close the lock body 400 (referring to FIG. 2A) to fix the front end portions 210, so as to achieve locking. In another embodiment shown in FIG. 5C, after the front end portions 210 are inserted into a lock hole 710, the user may reversely rotate the force bearing portion 331, so that the end 321 of the second driving member 320 that faces the rear end portions 220 is moved in the Y-axis direction to extend more deeply between the rear end portions 220. In this case, the rear end portions 220 can be moved away from each other, to further increase the opening width of the front end portions 210, thereby snapping the front end portions in the larger lock hole 710. Then, the user may further operate the lock body 400 to achieve locking.

In a different perspective, in the lockset 800 of the present invention, the opening width of the rotary hook 200 is adjusted by rotating the driving device 300. Since the force application member 330, the first driving member 310, and the second driving member 320 of the driving device 300 achieve mating and snapping by using the gear, the thread, and the like, the opening width of the rotary hook 200 may be controlled according to a degree of rotation. Since the rotation is substantially a continuous operation, continuous control of the opening width of the rotary hook 200 can be achieved. Therefore, the present invention is applicable to lock holes of different sizes and is convenient to use.

Although the foregoing description and drawings have disclosed exemplary embodiments of the present invention, it is necessary to understand that various additions, many modifications, and substitutions may be used in the exemplary embodiments of the present invention without departing from the spirit and scope of the principle of the present invention as defined in the claims attached. A person of original skill in the art of the present invention may understand that modifications of various forms, structures, arrangements, ratios, materials, elements and components may be made to the present invention. Therefore, the embodiments disclosed in this specification shall be construed as describing the present invention, but are not intended to limit the present invention. The scope of the present invention shall be subject to those defined in the attached claims, covers legal equivalents thereof, and is not limited to the foregoing description.

What is claimed is:

1. A lockset, comprising:

a housing, having a front opening at an end;

a rotary hook, disposed in the housing, rotatable relative to the housing, and comprising a front end portion and a rear end portion, wherein at least part of the front end portion extends out of the front opening, and the rear end portion extends in a direction opposite to the direction in which the front end portion extends;

a driving device, comprising:

a force application member, comprising a force bearing portion disposed outside the housing and a force application portion disposed inside the housing, wherein the force bearing portion is connected to the force application portion by penetrating the housing, and is rotatable with the force application portion relative to the housing;

a first driving member, disposed in the housing and rotatable with the force application portion with respect to a Y-axis; and a second driving member, disposed in the housing and rotatable with the first driving member with respect to the Y-axis to selectively move along the Y-axis, so as to change an opening width of the front end portions; and a lock body, disposed in the housing, wherein the lock body restricts a movement of the driving device when closed;

wherein the rotary hook comprises at least two rotary hooks, at least one of the rotary hooks is rotatable relative to the housing along a plane parallel to an X-Y plane, the second driving member is selectively movable to extend in the Y-axis direction by different depths between the rear end portions, so as to change the opening width of the front end portions, wherein an X axis, the Y axis, and a Z axis are orthogonal.

2. The lockset according to claim 1, wherein the force application portion is a disc having a plurality of protruding members disposed at a peripheral edge; and the first driving member is a gear, and the protruding members are snapped in tooth grooves of the gear, so that the first driving member is rotatable with the force application portion.

3. The lockset according to claim 2, wherein the lock body comprises a lock rod, when the lock body is closed, an end of the lock rod extends into the tooth grooves of the first driving member to restrict the rotation of the first driving member.

4. The lockset according to claim 3, wherein the lock rod is movable in the Y-axis direction.

5. The lockset according to claim 1, wherein the force application portion is rotatable along the plane parallel to the X-Y plane, and the first driving member is rotatable along a plane parallel to the X-Z plane.

6. The lockset according to claim 1, wherein the first driving member has a driving hole; and an end of the second driving member is movable in the Y-axis direction to be snapped in the driving hole, so that the second driving member is rotatable with the first driving member.

7. The lockset according to claim 1, wherein the housing has therein an accommodating space extending along the Y axis, and a sidewall thread is disposed on a sidewall of the accommodating space;

the second driving member is disposed in the accommodating space, and the second driving member is a circular cylinder having a driving member thread on a side surface that is mated with the sidewall thread; and when the first driving member is rotated, the second driving member is rotated with the first driving member, and under the action between the sidewall thread and the driving member thread, an end of the second driving member that faces the rear end portions is moved in the Y-axis direction to extend by different depths between the rear end portions.

8. The lockset according to claim 1, wherein an end of the second driving member that faces the rear end portions has an inclined plane.

9. The lockset according to claim 1, further comprising an elastic member, configured to provide an elastic force so that the rear end portions approach each other.

* * * * *